Sept. 4, 1928.
H. LENFERS
1,683,141
REVERSIBLE LIGHT FOR AUTOMOBILES
Filed Dec. 6, 1927
2 Sheets-Sheet 1
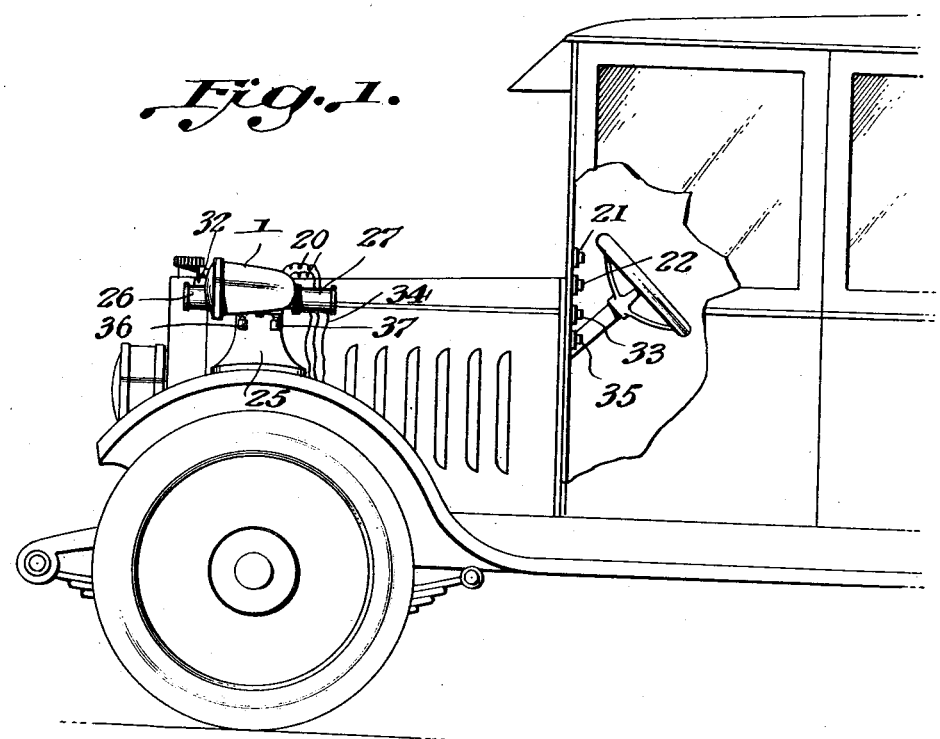
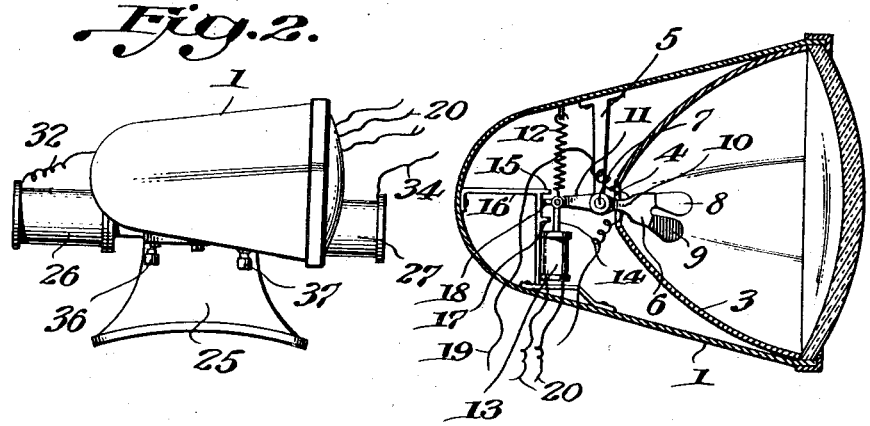
Inventor,
Harry Lenfers
By
Atty.

Sept. 4, 1928.
H. LENFERS
1,683,141
REVERSIBLE LIGHT FOR AUTOMOBILES
Filed Dec. 6, 1927     2 Sheets-Sheet 2
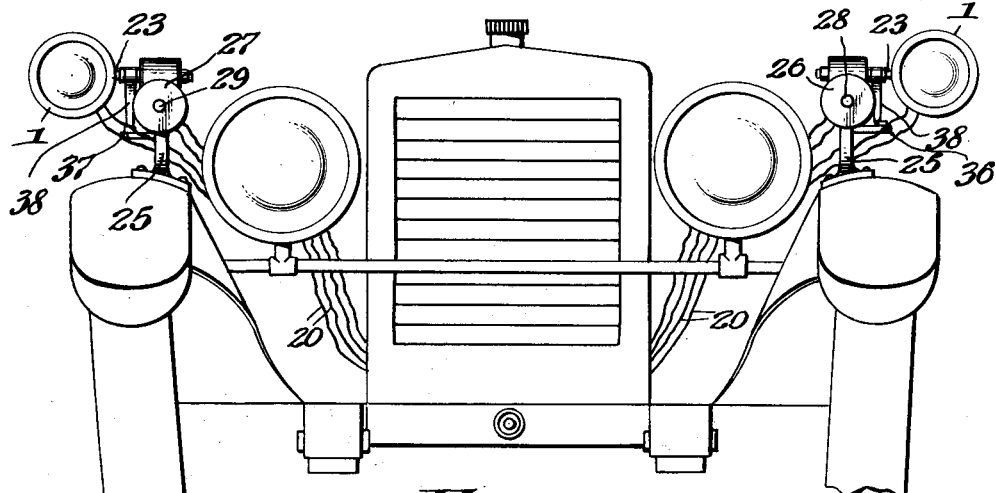
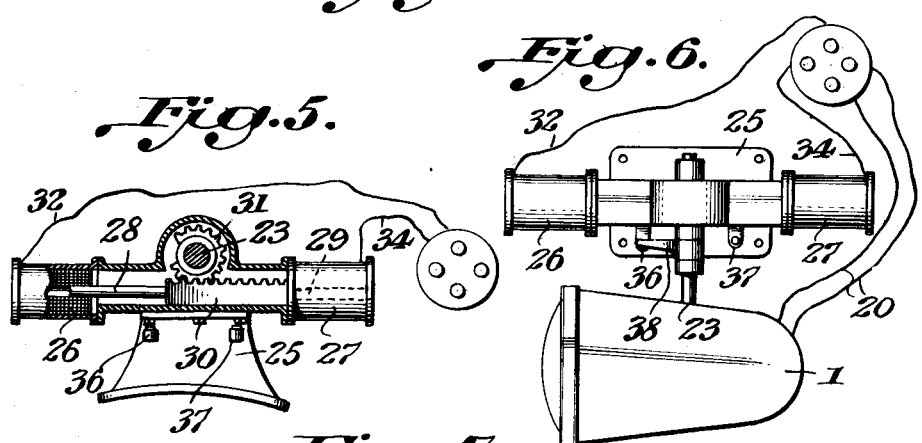
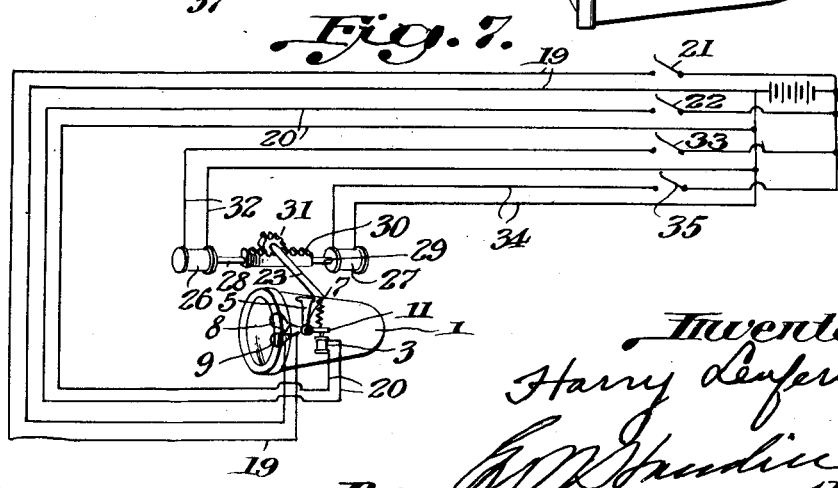

Patented Sept. 4, 1928.

1,683,141

UNITED STATES PATENT OFFICE.

HARRY LENFERS, OF EVANSVILLE, INDIANA.

REVERSIBLE LIGHT FOR AUTOMOBILES.

Application filed December 6, 1927. Serial No. 238,167.

This invention relates to an improved reversible light for automobiles which can be electrically controlled from the instrument board, or other suitable point, and automatically operated to illuminate the road, street or highway in advance of the car or to the rear thereof and, when desired, made to display a red, amber, or other cautionary or danger signal when in reversed position.

One or more of the reversible lights may be used and, if desired, they may be arranged for simultaneous control and operation.

My improved light is not intended to supplant the ordinary headlights used on an automobile but to supplement them by providing a powerful light which may be used to direct white or clear rays of light for a long distance in front, or to the rear, of the car or to serve as a cautionary or danger signal to warn drivers of cars approaching from the rear.

My reversible light enables the driver to instantly ascertain the condition of the road or street in the rear of his car, to learn whether cars are following him on the highway, and to brightly illuminate objects in the rear of his car when backing as, for instance, when parking or backing into a garage or other limited space.

The cautionary or danger signal, forming a part of the invention, affords a supplementary light of that character for use whenever such light is necessary, or as a substitute should the ordinary parking light or tail light become extinguished.

Other objects and advantages of the invention will appear more fully from the following description.

In the accompanying drawings:

Figure 1, is a side elevation of the front of an automobile, broken away, showing the invention;

Fig. 2, is a detail side elevation of the light, in reversed position;

Fig. 3, is a detail vertical section thereof;

Fig. 4, is a front view of an automobile, broken away, provided with the lights which are pointed forwardly;

Fig. 5, is a detail side elevation, partly in section, of the operating means for one of the lights;

Fig. 6, is a plan view of one of the lights and its operating mechanism, the light pointing forwardly; and Fig. 7, is a diagram showing the circuits for one of the lights.

As shown, there are two of the reversible lights provided on the car but it will be understood that the invention comprehends either one or two of them located on either or both sides of the automobile.

These lights are conveniently located on the front fenders or on brackets adjacent to the regular headlights, but they may be otherwise disposed. It will be understood that the circuits to only one of the lights are described and that when two lights are used, the circuits will include both of them so that they will operate simultaneously.

The light has a shell 1, lens 2 and reflector 3 which is provided with an opening 4 at its rear.

There is a bracket 5 located within the shell 1 at the rear of the reflector 3.

A twin electric lamp socket 6 is rockably mounted at 7 on the bracket 5 and carries an uncolored electric lamp bulb 8 in one of its sockets and a colored lamp 9 in its other socket. The lamp 9 may be red, amber, or other cautionary or danger color. The sockets 6 and the lamps 8 and 9 are located inside of the space in front of the reflector 3 and they are permitted to be raised or lowered because their support 10 is free to move up and down in the opening 4, the mounting 7 permitting this movement. An arm 11 which extends rearwardly from the mounting 7 and is integral with or connected to the part 7, serves as a means by which the twin sockets may be located in different positions vertically to bring either the lamp 8 or the lamp 9 into horizontal position. Normally, the lamp 8 is arranged horizontally and, when illuminated, serves as a bright light whose rays or beams are reflected by the reflector 3. When, however, it is desired to display the colored light 9 for use as a cautionary or danger signal, the arm 11 is operated to elevate the light 9 into horizontal position.

The lamp 8 is normally kept in horizontal or focal position by a contractile spring 12 connected to the arm 11 and to the shell 1.

For the purpose of pulling down the arm 11 against the action of the spring 12, thereby to elevate lamps 8 and 9 and bring lamp 9 into horizontal position for use as a cautionary or danger signal, there is provided a solenoid 13 having an armature 14 which is connected to the arm 11. The lamp 8 is prevented from being depressed below horizontal position, or substantially so, by a stop 15 on a bracket 16 which is secured within shell 1. The lamp 9 is prevented from rising beyond the substantially horizontal position by a stop 17 also adapted to engage the arm 11, said arm having its end 18 adapted to play between said stops 15 and 17.

The twin socket 6 derives its current from the circuit 19 and the solenoid may be energized through circuit 20.

The circuit 19 derives current from the battery of the car and may be opened or closed by any suitable switch 21 located in any point on the car, preferably on the instrument board or convenient to the driver. When this switch is closed, both lamps 8 and 9 are illuminated but the lamp 8 is arranged so that its beams will be properly reflected by the reflector 3.

The solenoid 13 has included in its circuit 20 the battery of the car and such circuit may be opened or closed by a switch 22 located adjacent the switch 21, or, as desired.

When the switch 22 is closed, the solenoid 13 draws down the armature 14, elevates the lamps 8 and 9, and brings the lamp 9 into focal position so that the cautionary or danger signal represented by the lamp 9 is properly displayed. The lamp 9 will remain in this position as long as the solenoid 13 is energized but immediately the switch 22 is opened, the spring 12 will raise the arm 11 and bring the lamp 8 into focal position.

As thus far described, my invention is complete, in so far as the use of the lamps 8 and 9 is concerned.

However, the invention also comprehends a reversibly mounted light operated by improved means now to be described.

The lamp shell 1 is provided with a shaft 23 arranged on a horizontal axis and mounted in a bearing 24 forming part of a frame or support 25 which may be secured anywhere on the car as, for instance, on one of the front fenders alongside the usual headlight. The shaft 23 being rockably mounted, enables the lamp to be directed forwardly or, on the other hand, to be reversed.

The frame 25 carries two solenoids 26, 27 whose respective armatures appear at 28, 29, there being provided a rack 30 which connects the armatures. A mutilated pinion 31 fixed to shaft 23, meshes with the rack 30. When one of the solenoids 26, 27 is energized, the pinion 31 is rotated in one direction and the lamp is then arranged so that the light rays will be directed forwardly, whereas when the other solenoid is energized, the light will be reversed and the rays will be directed toward the rear of the car.

The solenoid 26 is included in a circuit 32 which derives current from the battery and is under the control of a suitable switch 33 located adjacent to switches 21, 22, or elsewhere. When the switch 33 is closed the solenoid 26 is energized, attracting its armature 28 and turning the lamp in one direction. The solenoid 27 is included in a circuit 34 which derives its current from the battery, said circuit being controlled by switch 35, located adjacent switches 21, 22, 33, or elsewhere. When the switch 35 is closed, the position of the lamp will be reversed due to the energization of solenoid 27. Thus, one of the solenoids 26, 27, is utilized to turn the lamp into a forward position, whereas the other one of said solenoids is utilized to turn the lamp in the opposite direction.

The lamp is prevented from turning through a greater arc than 180° by the provision of stops 36 and 37 on the frame 25 and a stop 38 secured to the shaft 23.

When two of the reversible lights are provided, as shown in the drawings, all four of the lamps 8, 9, are controlled by switch 21 and both the solenoids 13 are controlled by switch 22. Under such an arrangement, both of solenoids 26 will be controlled by switch 33, and both of solenoids 27 by switch 35.

What I claim is:

1. In a reflecting lamp, the combination with the lens and reflector of the lamp, of a movably mounted multiple-socket lamp support all of whose sockets are jointly exposed in front of the reflector, independent electric bulbs carried by said sockets, and means controllable at will for moving the lamp support to position either one of said lamp bulbs in reflecting position in relation to the reflector.

2. In a reflecting lamp, the combination with the lens and reflector of the lamp, of a movably mounted multiple-socket lamp support all of whose sockets are jointly exposed in front of the reflector, independent electric bulbs carried by said sockets, and electro-magnetic means co-operating with said lamp support and controllable at will whereby one or the other of said bulbs may be arranged in reflecting position in relation to the reflector.

3. In a reflecting lamp, the combination with the lens and the reflector of the lamp, of a movably mounted plural lamp socket, all of whose sockets are jointly exposed in front of the reflector, electric lamp bulbs carried by the different sockets thereof, a circuit including said sockets whereby the lamps may be illuminated at the same time, and means controllable at will for shifting said plural lamp socket to dispose one or the other of the electric bulbs in reflecting position in relation to the reflector.

4. In a reflecting lamp, the combination with the lens and reflector thereof, of a pivotally mounted lamp support, electric lamp bulbs carried thereby, and means controllable at will for moving said support to different positions to arrange either one of the lamp bulbs in reflecting position in relation to said reflector at the will of the operator.

5. In a reflecting lamp provided with a lens and reflector, of a pivoted plural lamp socket, electric lamp bulbs carried thereby, a spring co-operating with said socket to normally hold it in a given position, a solenoid and armature co-operating with the socket and adapted, when energized, to move the socket from normal position so that another electric lamp bulb will be placed in reflecting position, and electric circuits controlling the lamp bulbs and the solenoids.

6. In a reversible light for automobiles, the combination with an electric lamp mounted to turn over to point to the front or to the rear of the automobile, of independently energizable electro-magnetic devices, respectively adapted to turn the lamp in opposite directions as aforesaid.

7. In a reversible light for automobiles, the combination with a pivoted lamp mounted to turn over to point to the front or to the rear of the automobile, of a pair of solenoids, armatures therefor, means operated by said armatures for turning the lamp in one direction or the other as aforesaid, and independent circuits and switches for the respective solenoids.

8. In a reversible light for automobiles, the combination with a pivoted electric lamp mounted to turn over to point to the front or to the rear of the automobile, of solenoids, connected armatures for said solenoids, means operatively connecting the armatures with the lamp whereby when one solenoid is energized the lamp will assume one position of the aforesaid and when the other solenoid is energized the lamp will assume a reversed position in relation thereto, and circuits and switches connecting the respective solenoids.

9. A reversible light for automobiles which is provided with clear and colored electric bulbs, either one of which is arranged to be brought into focal position, means whereby the bulbs may be shifted, and means for reversing the lamp to point it either forwardly or rearwardly in relation to the automobile.

In testimony whereof I affix my signature.

HARRY LENFERS.